US011390396B2

(12) United States Patent
Huang et al.

(10) Patent No.: US 11,390,396 B2
(45) Date of Patent: Jul. 19, 2022

(54) CONNECTING APPARATUS AND UNMANNED AERIAL VEHICLE COMPRISING CONNECTING APPARATUS

(71) Applicant: SZ DJI OSMO TECHNOLOGY CO., LTD., Shenzhen (CN)

(72) Inventors: Yongjie Huang, Shenzhen (CN); Ping Wang, Shenzhen (CN)

(73) Assignee: SZ DJI OSMO TECHNOLOGY CO., LTD., Shenzhen (CN)

( * ) Notice: Subject to any disclaimer, the term of this patent is extended or adjusted under 35 U.S.C. 154(b) by 423 days.

(21) Appl. No.: 16/386,476

(22) Filed: Apr. 17, 2019

(65) Prior Publication Data

US 2019/0241281 A1 Aug. 8, 2019

Related U.S. Application Data

(63) Continuation of application No. PCT/CN2016/102336, filed on Oct. 18, 2016.

(51) Int. Cl.
*B64D 47/08* (2006.01)
*B64C 39/02* (2006.01)

(52) U.S. Cl.
CPC ............ *B64D 47/08* (2013.01); *B64C 39/024* (2013.01); *B64C 2201/127* (2013.01)

(58) Field of Classification Search
CPC ..... B64D 47/08; B64C 39/024; F16N 13/022; G03B 15/006
See application file for complete search history.

(56) References Cited

U.S. PATENT DOCUMENTS

| 2,362,773 | A | * | 11/1944 | Robinson | B64D 7/02 |
| | | | | | 33/299 |
| 9,164,506 | B1 | * | 10/2015 | Zang | G05D 1/0094 |
| 9,280,038 | B1 | * | 3/2016 | Pan | G03B 17/561 |
| 9,435,520 | B2 | | 9/2016 | Segerstrom et al. | |
| 10,047,905 | B2 | * | 8/2018 | Yang | G03B 15/006 |
| 10,183,762 | B2 | * | 1/2019 | Zhao | F16M 11/18 |
| 2014/0049643 | A1 | | 2/2014 | Segerstrom et al. | |

(Continued)

FOREIGN PATENT DOCUMENTS

| CN | 204062340 U | 12/2014 |
| CN | 204096096 U | 1/2015 |

(Continued)

OTHER PUBLICATIONS

World Intellectual Property Organization (WIPO) International Search Report for PCT/CN2016/102336 dated Jul. 27, 2017 6 Pages.

*Primary Examiner* — Benjamin P Lee
(74) *Attorney, Agent, or Firm* — Anova Law Group, PLLC

(57) ABSTRACT

A connecting apparatus includes a snap-fit member configured to be detachably coupled to a gimbal or an unmanned aerial vehicle (UAV) and including a body and an accommodation space in the body, a movable member arranged in the accommodation space and configured to rotate relative to the snap-fit member, and a connector fixed to the movable member and configured to electrically couple the UAV and a photographing device carried by the gimbal. The connector is in a to-be-connected status when the movable member is at a first position. The movable member and the snap-fit member are in a locked status when the movable member is at a second position.

19 Claims, 5 Drawing Sheets

(56) References Cited

U.S. PATENT DOCUMENTS

| | | | |
|---|---|---|---|
| 2016/0137311 A1 | 5/2016 | Peverill et al. | |
| 2016/0352992 A1* | 12/2016 | Saika | F16M 11/041 |
| 2017/0075351 A1* | 3/2017 | Liu | H04N 5/2328 |
| 2017/0227162 A1* | 8/2017 | Saika | F16M 11/041 |
| 2017/0305570 A1* | 10/2017 | Heinonen | G05D 1/0808 |
| 2017/0321843 A1* | 11/2017 | Tian | F16M 13/04 |
| 2018/0346147 A1* | 12/2018 | Chen | G03B 17/561 |
| 2021/0080810 A1* | 3/2021 | Song | B64C 39/02 |

FOREIGN PATENT DOCUMENTS

| | | |
|---|---|---|
| CN | 204110368 U | 1/2015 |
| CN | 205045000 U | 2/2016 |
| CN | 105517646 A | 4/2016 |
| CN | 105517903 A | 4/2016 |
| CN | 106029503 A | 10/2016 |
| CN | 106794902 A | 5/2017 |
| CN | 206155811 U | 5/2017 |
| FR | 2802893 A1 | 6/2001 |
| GN | 105438491 A | 3/2016 |

\* cited by examiner ized in a certain attitude, e.g., changing a height and/or a direction of the photographing device and maintaining the photographing device in the changed attitude. Through the gimbal, the photographing device can be stabilized relatively effectively, such that photographing is smooth, and multi-angle photographing can be realized.

CONNECTING APPARATUS AND UNMANNED AERIAL VEHICLE COMPRISING CONNECTING APPARATUS

CROSS-REFERENCE TO RELATED APPLICATION

This application is a continuation application of International Application No. PCT/CN2016/102336, filed on Oct. 18, 2016, the entire contents of which are incorporated herein by reference.

TECHNICAL FIELD

The present disclosure relates to the field of unmanned aerial vehicle and, more particularly, to a connecting apparatus and unmanned aerial vehicle comprising the connecting apparatus.

BACKGROUND

In the conventional technologies, an unmanned aerial vehicle (UAV) is coupled to a gimbal, and the gimbal carries a photographing device. The gimbal is used to fix the photographing device, adjust an attitude of the photographing device, and maintain the photographing device stable in a certain attitude, e.g., changing a height and/or a direction of the photographing device and maintaining the photographing device in the changed attitude. Through the gimbal, the photographing device can be stabilized relatively effectively, such that photographing is smooth, and multi-angle photographing can be realized.

A tight coupling usually exists between the UAV and the gimbal, making it relatively hard to quickly disassemble and assemble the UAV and the gimbal. When the UAV is transported, the tight coupling causes the UAV to occupy a relatively large space. The tight coupling results in relatively complex, time-consuming, and effort-consuming operations for disassembling or replacing the gimbal coupled to the UAV. If a coupling approach of the detachable interface is adopted, reliability and durability of the coupling between the UAV and a gimbal bracket may be relatively poor, and hence the gimbal is relatively easy to fall off and be worn during transportation.

SUMMARY

In accordance with the disclosure, there is provided a connecting apparatus including a snap-fit member configured to be detachably coupled to a gimbal or an unmanned aerial vehicle (UAV) and including a body and an accommodation space in the body, a movable member arranged in the accommodation space and configured to rotate relative to the snap-fit member, and a connector fixed to the movable member and configured to electrically couple the UAV and a photographing device carried by the gimbal. The connector is in a to-be-connected status when the movable member is at a first position. The movable member and the snap-fit member are in a locked status when the movable member is at a second position.

Also in accordance with the disclosure, there is provided an unmanned aerial vehicle (UAV) including a gimbal carrying a photographing device, a fuselage, and a connecting apparatus fixedly coupled to the fuselage. The connecting apparatus includes a snap-fit member configured to be detachably coupled to the gimbal and including a body and an accommodation space in the body, a movable member arranged in the accommodation space and configured to rotate relative to the snap-fit member, and a connector fixed to the movable member. The connector is in a to-be-connected status when the movable member is at a first position. The movable member and the snap-fit member are in a locked status when the movable member is at a second position.

Also in accordance with the disclosure, there is provided a UAV including a gimbal carrying a photographing device, a fuselage, and a connecting apparatus fixedly coupled to the gimbal. The connecting apparatus includes a snap-fit member configured to be detachably coupled to the fuselage and including a body and an accommodation space in the body, a movable member arranged in the accommodation space and configured to rotate relative to the snap-fit member, and a connector fixed to the movable member. The connector is in a to-be-connected status when the movable member is at a first position. The movable member and the snap-fit member are in a locked status when the movable member is at a second position.

DETAILED DESCRIPTION OF THE EMBODIMENTS

Figure 1:
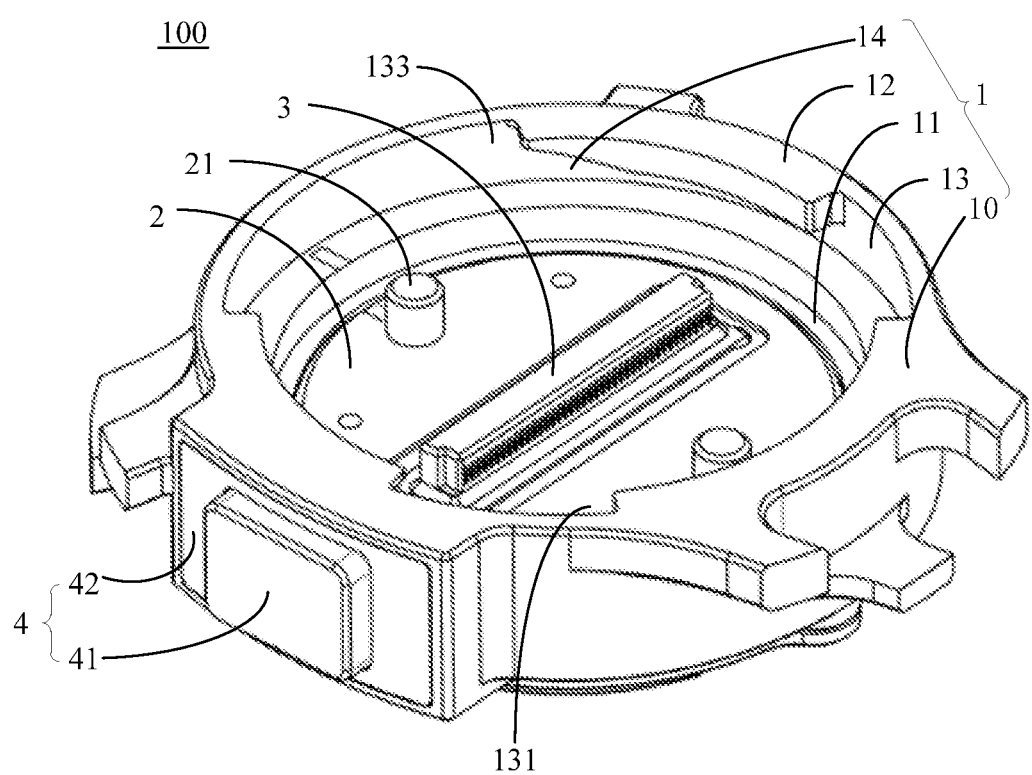
FIG. 1 is an axonometric view of an exemplary connecting apparatus consistent with various disclosed embodiments of the present disclosure.

Technical solutions of the present disclosure will be described with reference to the drawings. It will be appreciated that the described embodiments are some rather than all of the embodiments of the present disclosure. Other embodiments conceived by those having ordinary skills in the art on the basis of the described embodiments without inventive efforts should fall within the scope of the present disclosure.

Exemplary embodiments will be described with reference to the accompanying drawings, in which the same numbers refer to the same or similar elements unless otherwise specified.

As used herein, when a first component is referred to as "fixed to" a second component, it is intended that the first component may be directly attached to the second component or may be indirectly attached to the second component via another component. When a first component is referred to as "connecting" to a second component, it is intended that the first component may be directly connected to the second component or may be indirectly connected to the second component via a third component between them. The terms "perpendicular," "horizontal," "left," "right," and similar expressions used herein are merely intended for description.

Unless otherwise defined, all the technical and scientific terms used herein have the same or similar meanings as generally understood by one of ordinary skill in the art. As described herein, the terms used in the specification of the present disclosure are intended to describe exemplary embodiments, instead of limiting the present disclosure. The term "and/or" used herein includes any suitable combination of one or more related items listed.

Further, in the present disclosure, the disclosed embodiments and the features of the disclosed embodiments may be combined when there are no conflicts.

Referring to FIGS. 1 to 5, an unmanned aerial vehicle (UAV) 200 of the present disclosure includes a gimbal 7 carrying or equipped with a photographing device 72, a fuselage (not shown), and a connecting apparatus 100 fixedly coupled to the fuselage. The connecting apparatus 100 is used for coupling the UAV 200 to the gimbal 7 that carries the photographing device 72. The connecting apparatus 100 includes a snap-fit member 1, a movable member 2, and a connector 3. The snap-fit member 1 is used for detachably coupling to the gimbal 7. The snap-fit member 1 includes a body 10 and an accommodation space 11 arranged in the body 10. The movable member 2 is arranged in the accommodation space 11 and has a degree of freedom of rotation relative to the snap-fit member 1. The movable member 2 can realize rotation between a first position and a second position within a range of degree of freedom. The connector 3 is fixed to the movable member 2 for electrically coupling the photographing device 72 to the UAV 200. When the movable member 2 is at the first position, the connector 3 is in a to-be-connected status, i.e., a status that the connector 3 is to be connected. When the movable member 2 is at the second position, the movable member and the snap-fit member 1 are in a locked status.

In the UAV 200 of the present disclosure, one end of the snap-fit member 1 of the connecting apparatus 100 can be fixed to the fuselage, and the other end of the snap-fit member 1 can be detachably coupled to the gimbal 7, thereby realizing quick disassembly and/or assembly of the UAV 200 and the gimbal 7. The connector 3 arranged at the movable member 2 can be in wired communication with the photographing device 72 carried by the gimbal 7, realizing control and/or data communication between the photographing device 72 and a controller of the UAV 200. The movable member 2 is rotatable in the snap-fit member 1. When the movable member 2 is rotated to the first position, the connector 3 is at a positioning status, to be coupled to or connected to the gimbal 7. When the movable member 2 is rotated to the second position, the connector 3 is locked in a connection success status. Through the two-positioning, a connection process of the UAV 200 and the gimbal 7 can be simplified, and a connection operation can be relatively convenient.

Figure 4:
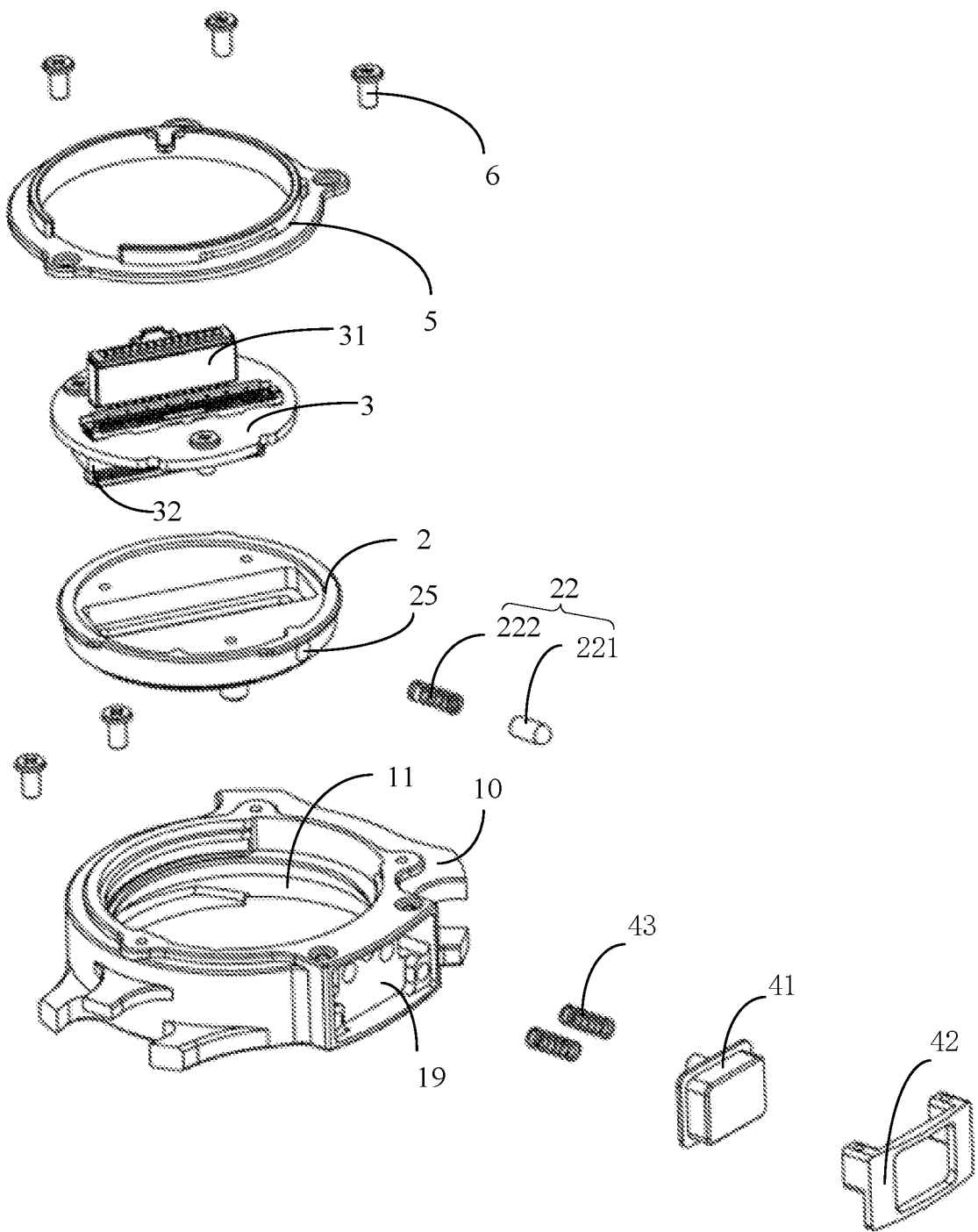
FIG. 4 is an exploded view of an exemplary connecting apparatus consistent with various disclosed embodiments of the present disclosure.

As shown in FIGS. 1 and 4, the fuselage includes a fixing member 5 that is screwed to a bottom of the snap-fit member 1 of the connecting apparatus 100. The bottom of the snap-fit member 1 and an outer edge of the fixing member 5 include screw holes. For coupling the connecting apparatus 100 to the UAV 200, screws 6 are screwed into screw holes of the snap-fit member 1 and the fixing member 5 to realize the cooping of the connecting apparatus 100 and the UAV 200.

Figure 5:
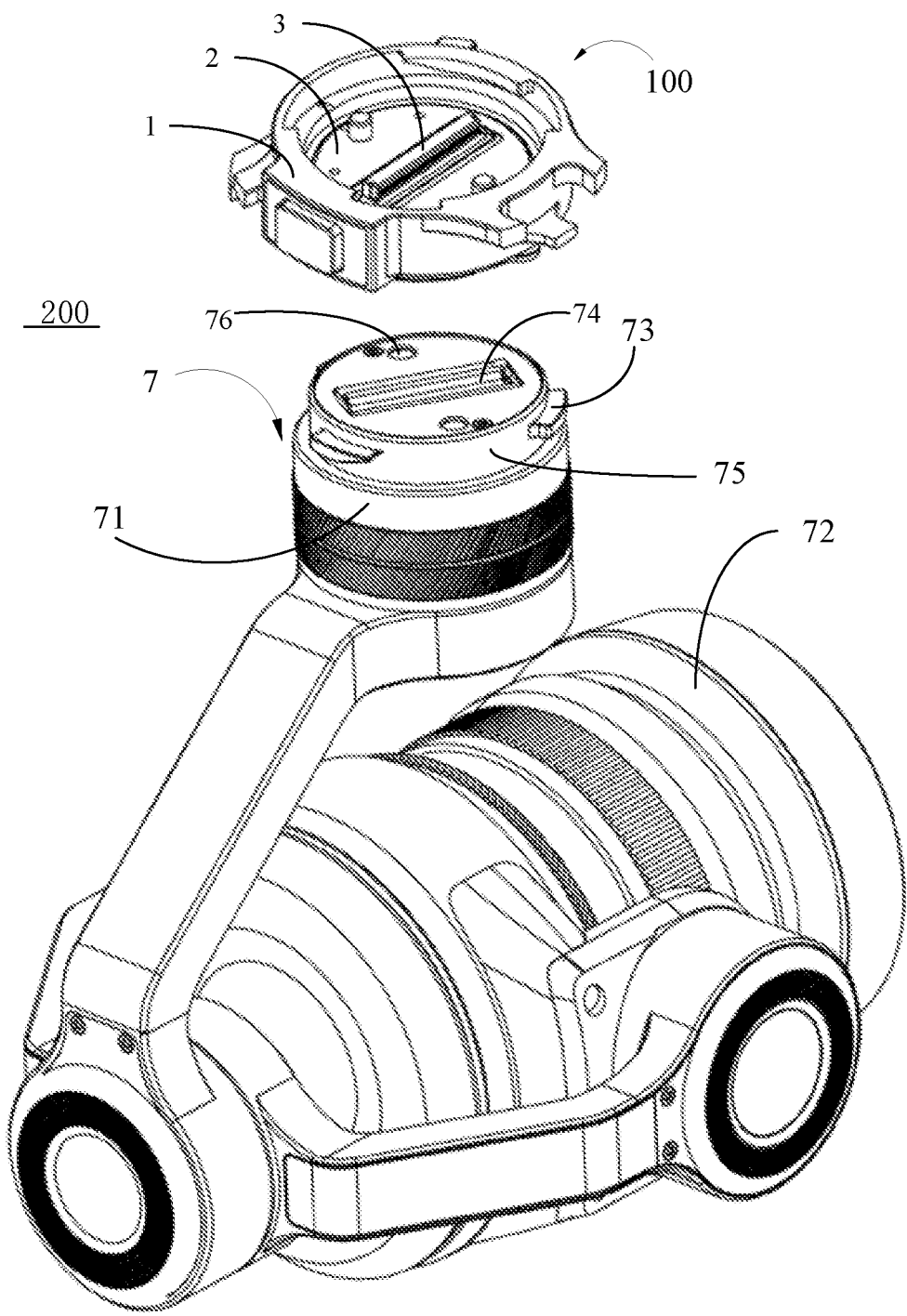
FIG. 5 shows exemplary gimbal and photographing device of an exemplary unmanned aerial vehicle consistent with various disclosed embodiments of the present disclosure.

Referring to FIG. 5, the gimbal 7 includes a coupling apparatus 71. The coupling apparatus 71 includes an engagement part 75 that is detachably coupled to the connecting apparatus 100. A fixing part 73 is arranged at an outer side of the engagement part 75. The body 10 of the snap-fit member 1 includes a snap-fit part 12 configured to be detachably coupled to the fixing part 73. As the gimbal 7 is coupled to the connecting apparatus 100, the fixing part 73 is at a bottom of the snap-fit part 12, and the fixing part 73 is pressed against and coupled to the snap-fit part 12.

In some embodiments, the snap-fit part 12 may be arranged at an end portion of the body 10, for rotatably coupling to the fixing part 73 of the gimbal 7. A rotation space 14 in communication with the accommodation space 11 may be arranged between the snap-fit part 12 and the body 10. The rotation space 14 can accommodate the fixing part 73 and allow it to rotate therein. The body 10 includes at least two openings 13 near the snap-fit part 12, and the at least two openings 13 are configured to match the gimbal 7. The at least two openings 13 include different sizes for foolproof coupling.

Figure 3:
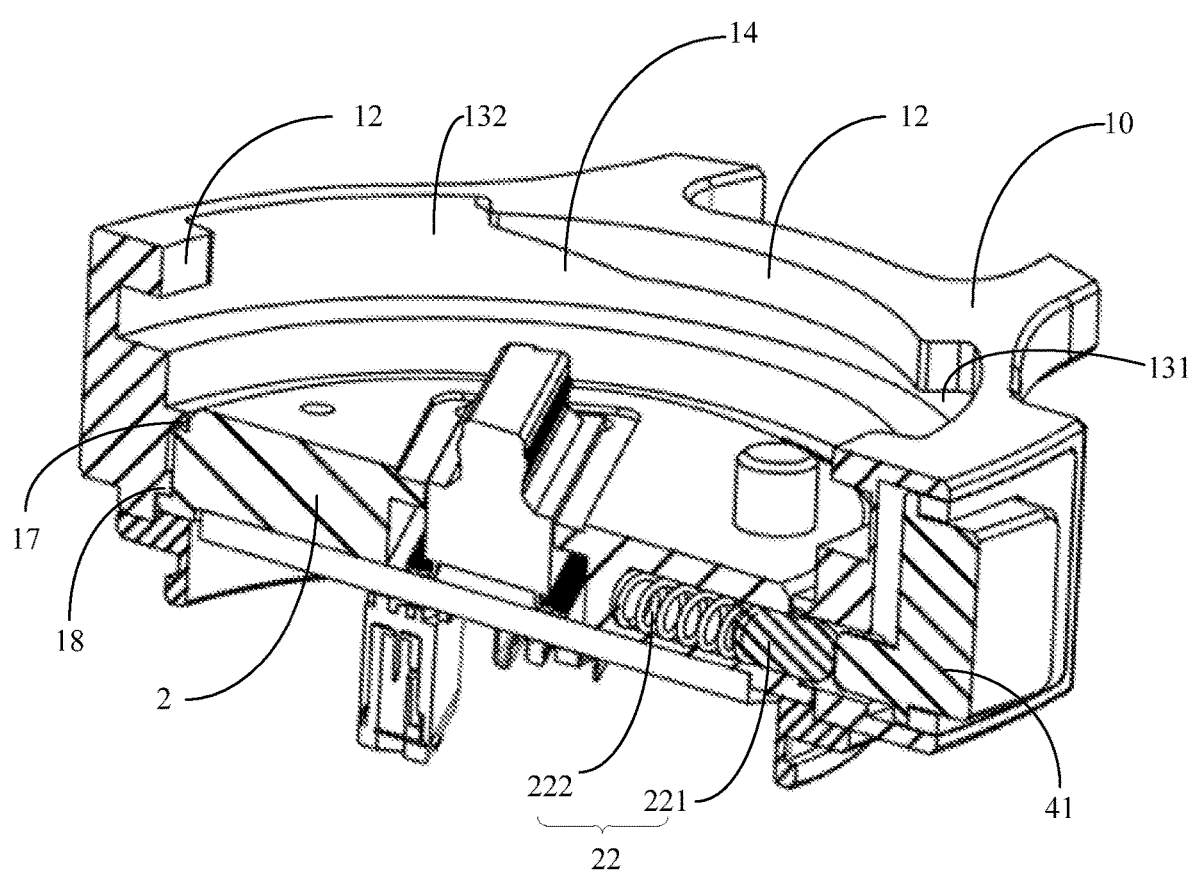
FIG. 3 is a cross-sectional view of an exemplary connecting apparatus consistent with various disclosed embodiments of the present disclosure.

As shown in FIG. 1 and FIG. 3, in some embodiments, three openings 13 are arranged, including a first opening 131, a second opening 132 and a third opening 133. The first opening 131 and the second opening 132 can have approximately same opening size and/or shape. An opening size of the third opening 133 may be larger than the opening size of the first opening 131 and the second opening 132. In some other embodiments, two openings 13 may be arranged, including the first opening 131 and the third opening 133, with the above-described second opening 132 being omitted. The opening size of the first opening 131 may be smaller than the opening size of the third opening 133. That is, the snap-fit member 1 may include at least two openings 13 matching the fixing part 73. The at least two openings 13 may be different in sizes, and the different sizes may be adopted for foolproof coupling.

Further, each of the openings 13 is arranged between adjacent snap-fit parts 12 and is connected to the rotation space 14. When the connecting apparatus 100 is being coupled to the coupling apparatus 71 of the gimbal 7, the fixing parts 73 are placed in alignment with the openings 13 and inserted into the rotation spaces 14 along the openings 13. Then, the coupling apparatus 71 is rotated, and the fixing parts 73 of the coupling apparatus 71 are rotated clockwise in the rotation spaces 14. The fixing parts 73 move under the snap-fit parts 12 during the rotation. When the fixing parts 73 are entirely under the snap-fit parts 12, the snap-fit parts 12 are pressed against and coupled to the fixing parts 73, and the snap-fit parts 12 are fixed with respect to the fixing parts 73.

Figure 2:
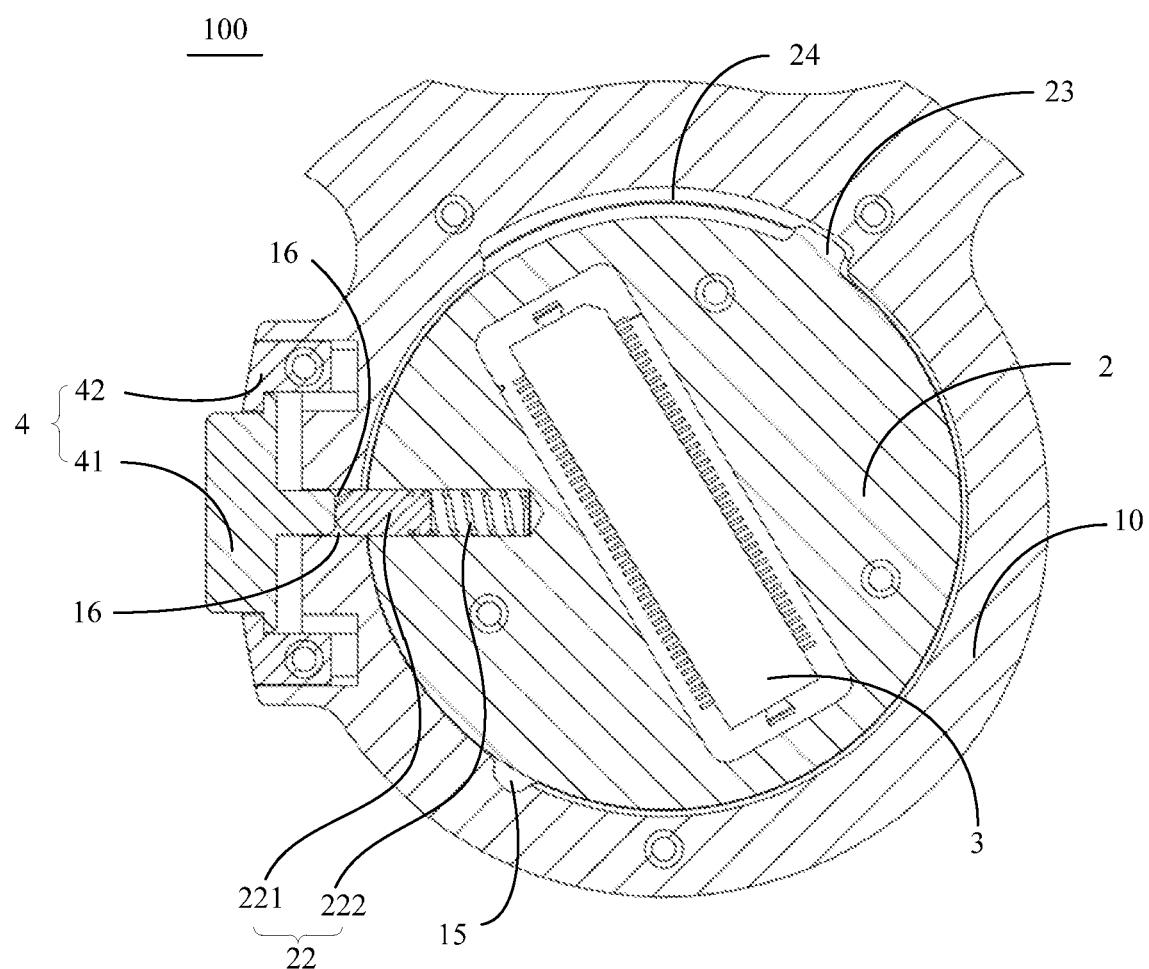
FIG. 2 is a sectional view of an exemplary connecting apparatus consistent with various disclosed embodiments of the present disclosure.

As shown in FIG. 2, the body 10 includes a guiding space 24 for guiding the rotation of the movable member 2, and the movable member 2 includes a protrusion 23 matching the guiding space 24. As the movable member 2 is being rotated, the protrusion 23 slides along the guiding space 24. As shown in FIG. 3, the guiding space 24 is formed between a first protrusion part 17 and a second protrusion part 18 extending from the body 10 to the accommodation space 11. In some embodiments, the guiding space 24 may include a groove arranged at the body 10, and the groove may be formed along an inner side wall of the body 10, and the protrusion 23 may extend into the guiding space 24 and slide in the guide space 24.

As shown in FIG. 2, the connecting apparatus 100 further includes a limiting structure (not labeled with a reference numeral) that can hold the movable member 2 in a first position or a second position. The limiting structure includes a first positioning groove 15 and a second positioning groove 16 arranged at an inner side wall of the body 10, and a limiting member 22 arranged at the movable member 2 that is configured to match the first positioning groove 15 or the second positioning groove 16. The first positioning groove 15 corresponds to the first position, and the second positioning groove 16 corresponds to the second position.

The first positioning groove 15 and the second positioning groove 16 are arranged at an inner side wall of the body 10 for limiting the degree of freedom of rotation of the movable member 2. The limiting member 22 can match the first positioning groove 15 or the second positioning groove 16. As the limiting member 22 matches the first positioning groove 15, i.e., at the first position, the connector 3 is at a to-be-connected status. As the limiting member 22 matches the second positioning groove 16, i.e., at the second position, the movable member 2 is at a locked status with respect to the snap-fit member 1.

As shown in FIG. 3, the movable member 2 includes a cavity 25 (see FIG. 4) arranged at a side wall of the movable member 2. An axis of the cavity 25 is approximately perpendicular to a central axis of the movable member 2. The cavity 25 can accommodate the limiting member 22. The limiting member 22 can be connected to the first positioning groove 15 or the second positioning groove 16 as the movable member 2 is rotated. Referring to FIG. 2, the limiting member 22 matches the first positioning groove 15 or the second positioning groove 16 as the movable member 2 is rotated, to position the movable member 2 at a corresponding position relative to the snap-fit member 1.

In some embodiments, the limiting member 22 includes an elastic member 222 matching the cavity 25 and a locking member 221 fixed to the elastic member 222. One end of the elastic member 222 abuts against a bottom of the cavity 25, and the other end of the elastic member 222 is fixedly coupled to the locking member 221. The locking member 221 abuts against the first positioning groove 15 or the second positioning groove 16 of the body 10 for positioning the movable member 2. The elastic member 222 may include a spring, and the locking member 221 may include a plunger. The locking member 221 matches the cavity 25 and is fixed to the elastic member 222.

In some embodiments, the elastic member 222 may include a spring sheet, and the locking member 221 may include a boss. The spring sheet may be arranged in the cavity 25. One end of the spring sheet may be fixed to the boss, and the boss may abut against the first positioning groove 15 or the second positioning groove 16 for positioning the movable member 2. The movable member 2 may be rotated to switch the connection with the first positioning groove 15 or the second positioning groove 16, by rotating the movable member 2, such that the positioning member 221 of the limiting member 22 matches or is disengaged from the first positioning groove 15 or the second positioning groove 16.

In some other embodiments, the limiting structure may include the first positioning groove 15 and the second positioning groove 16 arranged at the movable member 2, and the limiting member 22 arranged at the body 10 and matching the first positioning groove 15 or the second positioning groove 16. The first positioning groove 15 may correspond to the first position, and the second positioning groove 16 may correspond to the second position.

In these embodiments, the first positioning groove 15 and the second positioning groove 16 may be arranged at the movable member 2. For example, the first positioning groove 15 and the second positioning groove 16 may be arranged at a side wall of the movable member 2. The limiting member 22 may be arranged at the body 10, and the limiting member 10 may be arranged at a position corresponding to the first positioning groove 15 or the second positioning groove 16. Thus, the limiting member 22 can match the first positioning groove 15 or the second positioning groove 16. As compared to the above-described examples, location of the limiting member 22 and locations of the first positioning groove 15 and the second positioning groove 16 are switched.

In some embodiments, the limiting member 22 may include the elastic member 222 arranged at an inner side wall of the body 10, and the locking member 221 fixed to the elastic member 222. The locking member 221 may abut against the first positioning groove 15 or the second positioning groove 16 for positioning the movable member 2. In some embodiments, the elastic member 222 may include a spring, and the locking member 221 may include a plunger. In some other embodiments, the elastic member 222 may include a spring sheet, and the locking member 221 may include a boss.

Further, the second positioning groove 16 may include a through groove, configured to accommodate a portion of the locking member 221, such that the movable member 2 and the snap-fit member 1 are in a locked status. As shown in FIGS. 2 to 4, the connecting apparatus 100 further includes an unlocking switch 4 coupled to the second positioning groove 16. When the locking member 221 of the limiting member 22 is accommodated in the second positioning groove 16, the unlocking switch 4 may be pressed to eject the locking member 221 from the second positioning groove 16 through the elastic member 222 such as a spring, a spring sheet, or the like. Accordingly, the movable member 2 may be unlocked from the snap-fit member 1.

As shown in FIG. 2, the unlocking switch 4 includes a button 41 partially in the second positioning groove 16, and a bottom protrusion of the button 41 is arranged in the second positioning groove 16. The unlocking switch 4 further includes springs 43 (see FIG. 4) arranged between the snap-fit member 1 and the button 41, and a button cover 42 that covers the button 41 in a sleeve manner and is fixed to the snap-fit member 1. The snap-fit member 1 includes an accommodation part 19 for accommodating the unlocking switch 4. The button cover 42 is snapped at an opening of the accommodation part 19, and the button 41 is fixed in the button cover 42 to be movable in an axial direction thereof. When the positioning member 22 of the movable member 2 matches the second positioning groove 16, the movable member 2 is locked. Through the operation of the unlocking switch 4, the elastic member 222, such as a spring, a spring sheet, or the like, may be compressed, and the positioning member 22 may be pushed out of the second positioning groove 16, and the movable member 2 may be unlocked. The movable member 2 may be rotated to move to a location of the first positioning groove 15. When the positioning member 22 is in the second positioning groove 16, the gimbal 7 is fixed to the connecting apparatus 100. When the positioning member 22 is in the first positioning groove 15, the movable member 2 of the connecting apparatus 100 is in a to-be-connected status.

As shown in FIGS. 1 and 2, the movable member 2 further includes at least one positioning post 21 fixed to a surface of the movable member 2 and extending to the accommodation space 11. The positioning post 21 is used for matching the gimbal 7 to drive the movable member 2 to rotate. In some embodiments, two positioning posts 21 may be arranged at the movable member 2, and a corresponding engagement part 75 of the gimbal 7 may be provided with positioning grooves 76 corresponding to the positioning posts 21. The positioning post 21 is used for positioning, facilitating the positioning connection of the connecting apparatus 100 and the gimbal 7. The positioning post 21 is placed in the positioning groove 76 when the connecting apparatus 100 and the gimbal 7 are being connected.

As shown in FIGS. 1, 4 and 5, the connector 3 includes a first plug 31 and a second plug 32. The gimbal 7 includes a second socket 74 that is coupled to the second plug 32. The fuselage includes a first socket (not shown, refer to the second socket 74) that is coupled to the first plug 31. The gimbal 7 carries a photographing device 72. As the gimbal 7 is coupled to the UAV 200, the UAV 200 can perform wired communication with the photographing device 72 and the gimbal 7 through the first plug 31 and the second plug 32 of the connector 3. For example, image data collected by the photographing device 73 may be transmitted to the UAV 200, or the UAV 200 may transmit a control signal to the gimbal 7 and/or the photographing device 72, or the like.

During installation, the fixing part 73 of the gimbal 7 is aligned with the opening 13 of the connecting apparatus 100, and the fixing part 73 of the gimbal 7 enters the rotating space 14 along the opening 13. Correspondingly, the positioning groove 76 of the engagement part 75 of the gimbal 7 matches the positioning post 21. The coupling apparatus 71 of the gimbal 7 is rotated, and the positioning post 21 drives the movable member 2, such that the movable member 2 rotate from the first positioning groove 15 to the second positioning groove 16 in the snap-fit member 1. Correspondingly, the fixing part 73 is press-fitted with the snap-fit part 12. That is, the fixing part 73 is pressed against and matches the snap-fit part 12. When the limiting member 22 of the movable member 2 matches the second positioning groove 16, the movable member 2 is locked, and the gimbal 7 is successfully connected to the UAV 200. To unlock, the unlocking switch 4 is pressed to compress the elastic member 222, such as a spring, a spring sheet, or the like, to eject the locking member 221 of the limiting member 22. If there is no relevant setting of the unlocking switch 4, the gimbal 7 can be directly rotated to cause the movable member 2 to rotate, such that the locking member 221 is disengaged from the second positioning groove 16.

In the present disclosure, quick disassembly and assembly between the gimbal and the UAV can be realized, and relatively convenient use can be realized. The wired communication between the photographing device carried by the gimbal and the UAV can ensure stability and reliability of communication signals of the connecting apparatus and the gimbal, and can be relatively difficult to fall off, with high durability and long service life. Functionalities can be maintained, and user experience and appearance can be improved.

As shown in the figures, the UAV 200 consistent with the present disclosure includes the gimbal 7 carrying the photographing device 72, a fuselage, the connecting apparatus 100 fixedly coupled to the gimbal 7. The connecting apparatus 100 includes the snap-fit member 1, the movable member 2, and the connector 3. The snap-fit member 1 is used for detachably connecting with the fuselage. The movable member 2 is arranged in the snap-fit member 1 and includes a degree of freedom of rotation relative to the snap-fit member 1. The movable member 2 can be rotated between the first position and the second position within the degree of freedom. The connector 3 is fixed to the movable member 2 for electrically connecting the photographing device 72 to the UAV 200. The connector 3 is at a to-be-connected status when the movable member 2 is at the first position. When the movable member 2 is at the second position, the movable member 2 and the snap-fit member 1 are in a locked status.

The gimbal 7 includes the fixing member 5 that is screwed to a bottom of the snap-fit member 1. Different from above-described examples, in some embodiments, the connecting apparatus 100 is fixed to the gimbal 7, and the snap-fit member 1 is detachably coupled to the fuselage of the UAV 200. The snap-fit part 12 for rotatably coupling to the UAV 200 is arranged at an end portion of the body 10. The rotation space 14 in communication with the accommodation space 11 is arranged between the snap-fit part 12 and the body 10. The body 10 includes at least two openings 13 near the snap-fit part 12, and the at least two openings 13 are used for matching the fuselage of the UAV. The at least two openings 13 include different sizes for foolproof coupling. In these embodiments, the connection apparatus 100 may have structures same as or similar to that of the connection apparatus 100 of the UAV 200 in the above-described examples, except for some positional switch and different connection relationships.

According to the above-described examples, the connecting apparatus 100 of the present disclosure may be configured to be fixedly attached to the UAV 200 and detachably coupled to the gimbal 7, or may be configured to be fixedly attached to the gimbal 7 and detachably coupled to the UAV 200.

The connecting apparatus may realize quick assembly and disassembly of the UAV and the gimbal, facilitating transportation and replacement of the gimbal. The connection may be reliable. Further, the UAV can establish relatively efficient and reliable communication with the photographing device carried by the gimbal.

Other embodiments of the disclosure will be apparent to those skilled in the art from consideration of the specification and practice of the embodiments disclosed herein. It is intended that the specification and examples be considered as exemplary only and not to limit the scope of the disclosure, with a true scope and spirit of the invention being indicated by the following claims.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. A connecting apparatus comprising:
a snap-fit member configured to be detachably coupled to a gimbal or an unmanned aerial vehicle (UAV), the snap-fit member including a body and an accommodation space in the body;
a movable member arranged in the accommodation space, and configured to rotate relative to the snap-fit member, the movable member including a through hole; and
a connector fixed to the movable member and configured to electrically couple the UAV and a photographing device carried by the gimbal, the connector including a plug passing through the through hole;
wherein:
the connector is in a to-be-connected status when the movable member is at a first position; and
the movable member and the snap-fit member are in a locked status when the movable member is at a second position.

2. The apparatus according to claim 1, wherein:
the body includes a guiding space for guiding rotation of the movable member; and the movable member includes a protrusion matching the guiding space and configured to slide along the guiding space when the movable member rotates.

3. The apparatus according to claim 2, wherein the guiding space is formed between a first protrusion part and a second protrusion part extending from the body to the accommodation space.

4. The apparatus according to claim 1, wherein:
the snap-fit member further includes a snap-fit part arranged at an end portion of the body, the snap-fit part being configured to be rotatably coupled to the gimbal or the UAV; and
the snap-fit part and the body form a rotation space in communication with the accommodation space.

5. An unmanned aerial vehicle (UAV) comprising:
a gimbal carrying a photographing device;
a fuselage; and
a connecting apparatus fixedly coupled to the fuselage, the connecting apparatus including:
 a snap-fit member configured to be detachably coupled to the gimbal, the snap-fit member including a body and an accommodation space in the body;
 a movable member arranged in the accommodation space, and configured to rotate relative to the snap-fit member, the movable member including a through hole; and
 a connector fixed to the movable member, the connector including a plug passing through the through hole;
wherein:
 the connector is in a to-be-connected status when the movable member is at a first position; and
 the movable member and the snap-fit member are in a locked status when the movable member is at a second position.

6. The UAV according to claim 5, wherein the fuselage includes a fixing member screwed to a bottom part of the snap-fit member.

7. The UAV according to claim 5, wherein:
the gimbal includes a coupling apparatus including:
 an engagement part; and
 at least one fixing part arranged at an outer side of the engagement part; and
the snap-fit member includes at least one snap-fit part configured to be detachably coupled to the at least one fixing part.

8. The UAV according to claim 7, wherein:
the at least one fixing part includes at least two fixing parts and the at least one snap-fit part includes at least two snap-fit parts;
the snap-fit member further includes at least two openings matching the at least two fixing parts and having different sizes;
at least one rotation space is formed between the at least two snap-fit parts and the body, the rotation space being in communication with the accommodation space; and
each of the at least two openings is arranged between adjacent ones of the at least two snap-fit parts and is in communication with one of the at least one rotation space.

9. The UAV according to claim 5, wherein:
the connector includes a first plug and a second plug;
the fuselage includes a first socket coupled to the first plug; and
the gimbal includes a second socket coupled to the second plug.

10. The UAV according to claim 5, wherein:
the body includes a guiding space for guiding rotation of the movable member; and
the movable member includes a protrusion matching the guiding space and configured to slide along the guiding space when the movable member rotates.

11. The UAV according to claim 5, wherein the connecting apparatus further includes a limiting structure configured to maintain the movable member at the first position or the second position.

12. The UAV according to claim 11, wherein the limiting structure includes:
a first positioning groove and a second positioning groove arranged at an inner side wall of the body, the first positioning groove corresponding to the first position, and the second positioning groove corresponding to the second position; and
a limiting member arranged at the movable member and configured to match the first positioning groove or the second positioning groove, the limiting member including a locking member configured to abut against the first positioning groove or the second positioning groove to position the movable member.

13. The UAV according to claim 12, wherein:
the movable member includes a cavity arranged at a side wall of the movable member and configured to accommodate the limiting member, an axis of the cavity being approximately perpendicular to a central axis of the movable member; and
the limiting member is configured to be coupled to the first positioning groove or the second positioning groove when the movable member rotates.

14. The UAV according to claim 13, wherein the locking member is configured to match the cavity and is fixed to an elastic member.

15. The UAV according to claim 14, wherein the second positioning groove includes a through groove configured to accommodate a portion of the locking member to cause the movable member and the snap-fit member to be in the locked status.

16. The UAV according to claim 12, wherein the connecting apparatus further includes an unlocking switch coupled to the second positioning groove and configured to, in response to being pressed, eject the locking member from the second positioning groove to unlock the movable member from the snap-fit member.

17. The UAV according to claim 11, wherein the limiting structure includes:
a first positioning groove and a second positioning groove arranged at the movable member, the first positioning groove corresponding to the first position, and the second positioning groove corresponding to the second position; and
a limiting member arranged at the body and configured to match the first positioning groove or the second positioning groove.

18. The UAV according to claim 17, wherein:
the first positioning groove and the second positioning groove are arranged at a side wall of the movable member; and
the limiting member includes:
 an elastic member arranged at an inner side wall of the body; and
 a locking member fixed to the elastic member and configured to abut against the first positioning groove or the second positioning groove for positioning the movable member.

19. An unmanned aerial vehicle (UAV) comprising:
a gimbal carrying a photographing device,
a fuselage, and
a connecting apparatus fixedly coupled to the gimbal, the connecting apparatus including:
- a snap-fit member configured to be detachably coupled to the fuselage, the snap-fit member including a body and an accommodation space in the body;
- a movable member arranged in the accommodation space, and configured to rotate relative to the snap-fit member, the movable member including a through hole; and
- a connector fixed to the movable member, the connector including a plug passing through the through hole;

wherein:
- the connector is in a to-be-connected status when the movable member is at a first position; and
- the movable member and the snap-fit member are in a locked status when the movable member is at a second position.

\* \* \* \* \*